July 20, 1965 W. E. INGERSON ETAL 3,196,446
PLOTTING BOARD INTERCHANGE CIRCUIT
Original Filed March 25, 1952 2 Sheets-Sheet 1

INVENTORS
W. E. INGERSON
H. G. OCH
BY Harry M. Saragovitz,
Edward J. Kelly &
Herbert Berl
ATTORNEYS

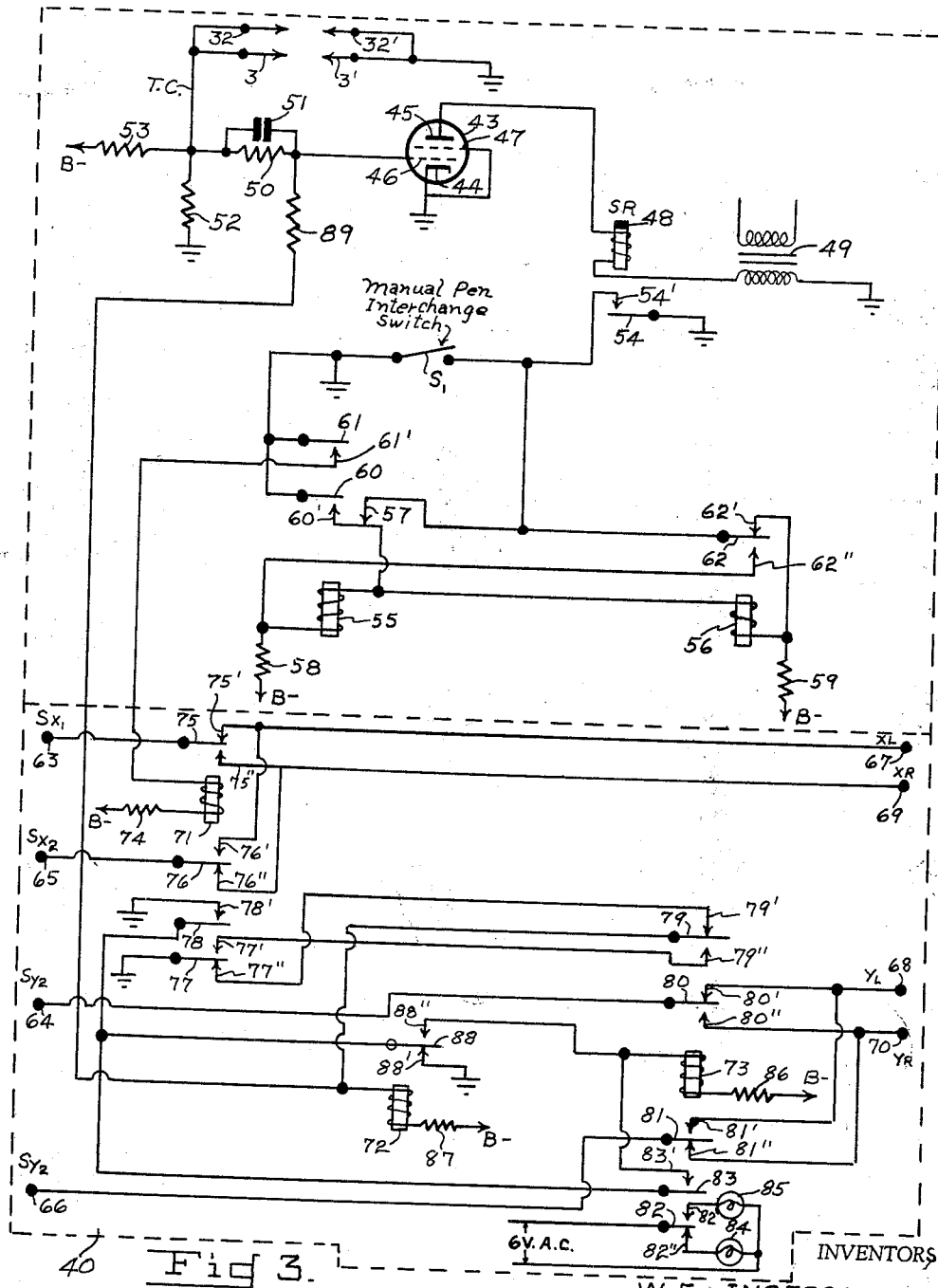

United States Patent Office 3,196,446
Patented July 20, 1965

3,196,446
PLOTTING BOARD INTERCHANGE
CIRCUIT
William E. Ingerson, Watchung, and Henry G. Och, Madison, N.J., assignors, by mesne assignments, to the United States of America as represented by the Secretary of the Army
Continuation of application Ser. No. 278,354, Mar. 25, 1952. This application June 19, 1964, Ser. No. 391,350
8 Claims. (Cl. 346—8)

This is a continuation of application Serial No. 278,354, filed March 25, 1952.

The present invention relates to a plotting board for simultaneously plotting two-directional information of the positions of two movable points in space, such as the observed positions of two objects in space, or the observed position and the predicted, future position of one object in space.

More particularly the present invention relates to a control circuit for automatically interchanging the information supplied to the two pen mechanism of the plotting board in case of interference between the two pens or in case of predetermined lateral overlap of the two pens.

It is accordingly an object of the present invention to provide a plotting board and associated circuits for simultaneously plotting two-dimensional information concerning the positions of two movable points in space by means of two pen mechanisms without the risk of interference between the two pen mechanisms during operation thereof, wherein the positions of the two movable points in space may correspond either to the observed positions of two objects in space, or the observed position and the predicted, future position of one object in space.

It is another object of the present invention to provide a pen interchange switching circuit which interchanges automatically the data supplied to the respective pen mechanisms during the course of plotting in case of interference between the pens.

It is another object of the present invention to provide an automatic switching circuit to interchange automatically the data supplied to the respective pen mechanism during the course of plotting in case of predetermined lateral overlap between the pens.

It is still a further object of the present invention to provide an automatic switching circuit to interchange automatically the data supplied to the respective pen mechanisms during the course of plotting which is simple in structure and reliable in operation.

It is another object of the present invention to provide an automatic switching circuit to interchange either manually or automatically the two-dimensional informations corresponding to two moving points supplied to the respective pen mechanisms of the plotting board by using an electronic trigger circuit to initiate the switching mechanism.

It is another object of the present invention to provide an automatic switching circuit for interchanging the data corresponding to the two-dimensional informations of the positions of two points in space supplied to the respective pen mechanisms of the plotting board in such a manner as to first move apart and separate the plotting arms by first interchanging the data corresponding to one dimension and thereafter interchanging the data corresponding to the other dimension.

It is a still further object of the present invention to provide an automatic switching circuit including an electronic trigger circuit for interchanging the data supplied to the two pen mechanisms of the plotting board wherein the trigger circuit includes a delay circuit to prevent immediate reoperation of the trigger tube through accidental contact between the two pens while the initial interference, which had operated the trigger circuit, is still being relieved.

The specific nature of the invention as well as other objects and advantages thereof will be obvious from the following description taken in connection with the accompanying drawings which show for purposes of illustration only one specific embodiment of the present invention and wherein:

FIGURE 3 represents the circuit diagram of the pen interchange relay panel and the trigger circuit in accordance with the present invention.

Figure 1:
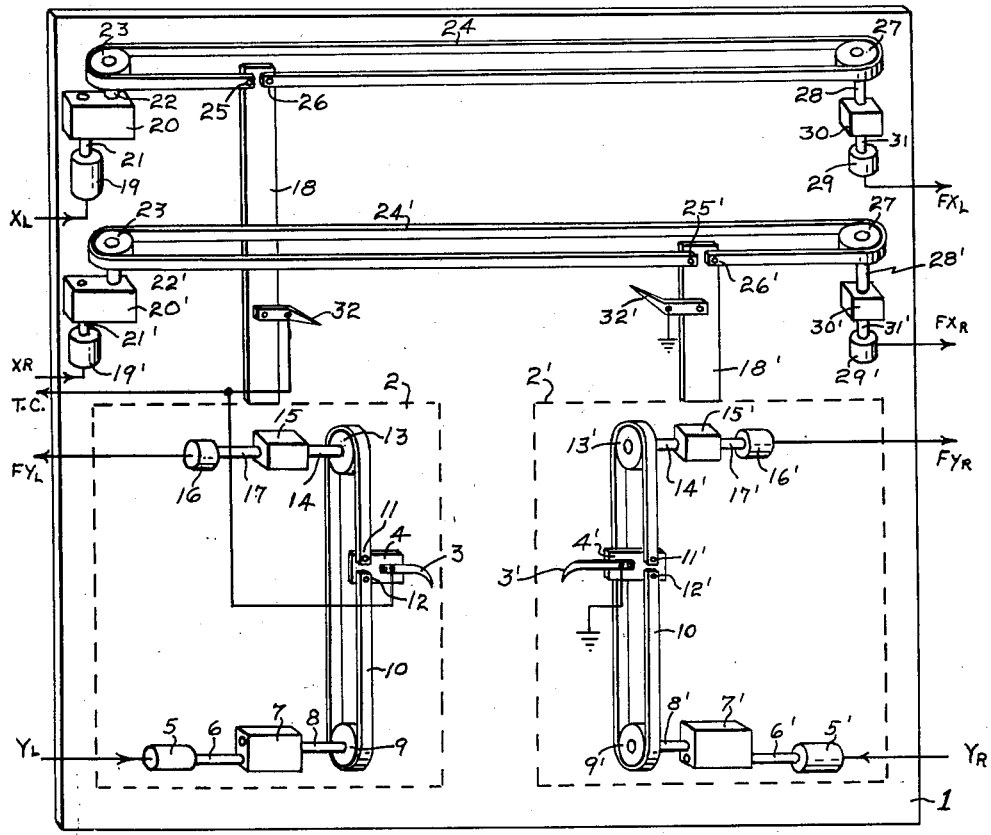
FIGURE 1 shows schematicaly the plotting board including the pen mechanisms in accordance with the present invention.

Referring more particularly to the drawings where like reference numerals are used to designate like parts in the various figures thereof, reference numeral 1 illustrates the plotting board as shown in FIGURE 1, on which are schematically indicated by dotted lines 2 and 2' the blocks representing respectively the left and right pen mechanisms. Each pen mechanism includes a pen 3 and 3' mounted on pen supports 4 and 4' respectively. The left pen 3 is driven in the vertical direction by motor 5 through motor shaft 6, reduction gearing mechanism 7, connecting shaft 8 and drive pulley 9 which is rigidly secured to shaft 8 in any conventional manner as by keying or press-fit. Belt 10 fastened at both its ends 11 and 12 to pen support 4 passes over drive pulley 9 and is driven thereby in an upward or downward direction depending on the direction of rotation of reversible motor 5. Reference numeral 13 designates a driven pulley over which passes belt 10. Shaft 14 is secured to pulley 13 in any conventional manner as by keying or press-fit and drives a reduction gearing mechanism 15, which in turn drives the movable arm of potentiometer-follower 16 through shaft 17. The input to motor 5 is denoted as $Y_L$ since motor 5 moves the "left" pen 3 in the "vertical" or "Y" direction. The output from potentiometer-follower 16 is denoted as $F_{Y_L}$ since the voltage derived from the movable arm to which the output lead is electrically connected corresponds to the "vertical" position of the "left" pen 3.

Similarly the right pen 3' is driven in the vertical direction by motor 5' through motor shaft 6', reduction gearing mechanism 7', connecting shaft 8' and drive pulley 9' which is rigidly secured to shaft 8' in any conventional manner as by keying or press-fit. Belt 10' fastened at both its ends 11' and 12' to pen support 4' passes over drive pulley 9' and is driven thereby in an upward or downward direction depending on the sense of rotation of motor 5'. Reference numeral 13' designates a driven pulley over which passes belt 10'. Shaft 14' is secured to pulley 13' in any conventional manner as by keying or press-fit and drives reduction gearing mechanism 15', which in turn drives the movable arm of potentiometer 16' through shaft 17'. The input to motor 5' is denoted as $Y_R$ since motor 5' moves the "right" pen 3' in the "vertical" or "Y" direction. The output from potentiometer-follower 16' is denoted as $F_{Y_R}$ since the voltage derived from the movable arm to which the output lead is electrically connected corresponds to the "vertical" position of the "right" pen 3'. In order to prevent slippage between belt 10 and driven pulley 13 and between belt 10' and driven pulley 13' any conventional belt-tightening device (not shown) may be incorporated in both vertical pen driving mechanisms.

Pen mechanisms 2 and 2' are carried by arms 18 and 18' respectively which move the same in a "horizontal" or "X" direction. Motors 19 and 19' drive reduction gearing mechanisms 20 and 20' through motor shafts 21 and 21′, while connecting shafts 22 and 22′ apply the output of reduction gearing mechanisms 20 and 20′ to drive pulleys 23 and 23′ respectively to which shafts 22 and 22′ are secured in any conventional manner as by keying or press-fit. Belts 24 and 24′ which are fastened to arms 18 and 18′ at their respective ends 25, 26 and 25′, 26′ pass over drive pulleys 23 and 23′ and the driven thereby. Belts 24 and 24′ also pass over driven pulleys 27 and 27′ to which are secured shafts 28 and 28′ which drive the movable arms of follower potentiometers 29 and 29′ through reduction gearing mechanisms 30 and 30′ and connecting shafts 31 and 31′. Attached to arms 18 and 18′ are contacts 32 and 32′ shown herein for purposes of illustration as knife edges, of which contact 32 is bent to protrude in a direction out of the drawing while contact 32′ is bent to extend in a direction into the drawing. The trigger control circuit denoted as T.C. is electrically connected to contact 32 and to pen 3 whereas contact 32′ and pen 3′ are electrically connected to ground so that ground is applied to trigger control circuit T.C. in the case of interference between pens 3 and 3′ or in the event of excessive overlap of arms 18 and 18′ determined only by the particular mounting and shape of contacts 32 and 32′. The effect of grounding trigger control circuit T.C. will be more fully described hereinafter with reference to FIGURE 3. The input to motor 19 is denoted as $X_L$ since motor 19 moves the "left" pen mechanism 2 in a "horizontal" or "X" direction, while the input to motor 19′ is denoted as $X_R$ since motor 19′ moves the "right" pen mechanism 2′ in a "horizontal" or "X" direction. The output from potentiometer-follower 29 is denoted as $F_{X_L}$ since the voltage derived from the movable arm of potentiometer 29 to which the output lead is electrically connected corresponds to the "horizontal" position of the left pen mechanism 2, while the output from potentiometer-follower 29′ is denoted as $F_{X_R}$ since the voltage derived from the movable arm of potentiometer 29′ to which the output lead is connected corresponds to the "horizontal" position of the "right" pen mechanism 2′. In order to prevent slippage between belt 24 and driven pulley 27, and between belt 24′ and driven pulley 27′ any conventional belt-tightening device (not shown) may be incorporated in both horizontal pen driving mechanisms. Potentiometer-followers 16, 16′, 29 and 29′ may be energized from a direct current power source (not shown) in any conventional manner. It is further understood that appropriate limit switches may be incorporated in both pen mechanisms 3 and 3′ to limit the movements thereof in both the vertical and horizontal directions.

Figure 2:
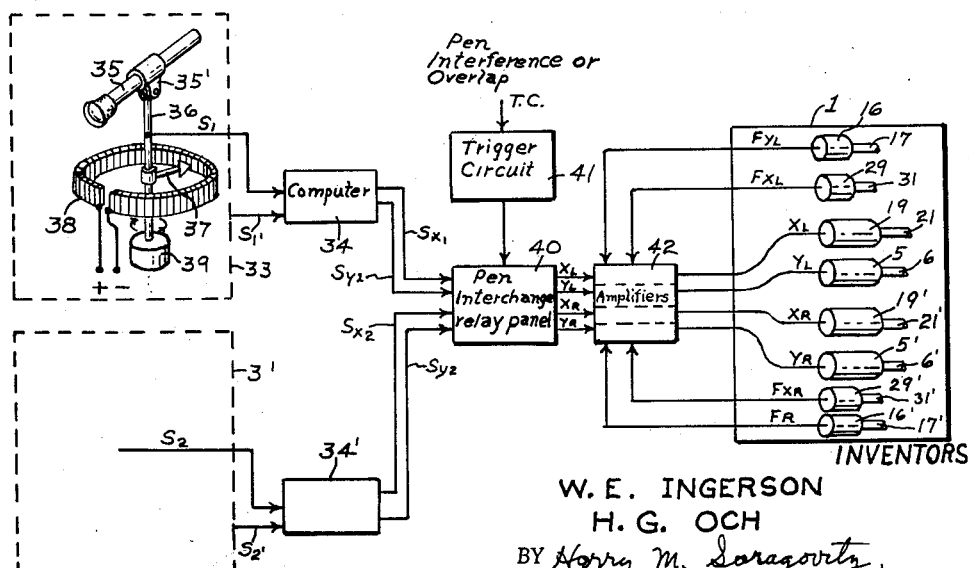
FIGURE 2 is a block diagram showing the overall operation of the system in accordance with the present invention.

FIGURE 2 illustrates in block diagrammatic form one possible arrangement of the overall system for use with the pen interchange relay system in accordance with the present invention. More particularly dotted blocks 33 and 33′ represent two observing posts for obtaining two-dimensional informations of two moving objects, the movement of which is to be plotted independently on plotting board 1, and for transmitting electrical signals $S_1$ and $S_2$ corresponding to such two-dimensional informations from observing posts 33 and 33′ to computers 34 and 34′.

One specific embodiment fulfilling the requirements of such observation posts is shown with respect to block 33 which comprises a telescope 35 rotatably mounted in azimuth by means of bracket 35′ on shaft 36 which is rigidly secured to the movable arm 37 of potentiometer 38; the terminals of potentiometer 38 are connected to a conventional source of direct current power supply (not shown). Shaft 36 is supported in pedestal 39 which may include suitable bearings (not shown). It is thus clear that the signal voltage $S_1$ in the output lead from observing post 33 which is electrically connected to the movable arm 37 through shaft 36, depends on the position in azimuth of telescope 35. Since observing post 33′ is similar to post 33 in construction and function the details thereof are not shown or described herein. Signal voltages $S_1′$ and $S_2′$ are representative of the distances of the observed objects and may be obtained in any conventional manner as is known in connection with prior art range finders, such as optical range finders or radar systems. It is well understood however that any other optical or electrical systems such as radar systems, may be substituted for the one presently shown and described with reference to posts 33 and 33′. The computer outputs comprise signals $S_{X_1}$ and $S_{Y_1}$ corresponding to the two-dimensional information $S_1$ from observation post 33, and signals $S_{X_2}$ and $S_{Y_2}$ corresponding to the two-dimensional information $S_2$ from observation post 33′. While we have shown posts 33 and 33′ for observation of two objects in space, it is understood however that the information from one post may be used only for plotting present and predicted, future positions of one object only. This may be accomplished in its simplest form, for instance, by utilizing the signal voltages $S_1$ and $S_1′$ and by passing them through appropriate circuits to determine the future, predicted position of such object so that signal voltages $S_{X_2}$ and $S_{Y_2}$ then correspond to the predicted future position of the object observed by post 33. Trigger circuit 41 which itself is actuated by trigger control circuit T.C. as a result of pen interference or pen overlap is connected to pen interchange relay panel 40 as will be more fully described with reference to FIGURE 3. The two signal outputs channels $X_L$, $Y_L$ and $X_R$, $Y_R$ corresponding to signals $S_{X_1}$, $S_{Y_1}$ and signals $S_{X_2}$, $S_{Y_2}$, or vice versa, as determined by the particular position of the pen interchange relay panel 40, are fed through appropriate amplifier stages 42 to motors 19, 5, 19′ and 5′ as shown in both FIGURES 1 and 2. The signal outputs $F_{X_L}$, $F_{Y_L}$ and $F_{X_R}$, $F_{Y_R}$ from potentiometer followers 29, 16 and 29′, 16′ are fed back as error voltages to amplifiers 42.

The details of pen interchange relay panel 40 and of trigger circuit 41 are illustrated in FIGURE 3 wherein blocks 40 and 41 are indicated in dotted lines. Trigger circuit 41 comprises a trigger tube 43 which may be of the thyratron type as, for example, a tetrode thyratron tube type 2050, which includes a cathode 44, a plate or anode 45, a first control grid 46 and a second control grid 47 electrically connected to cathode 44, the latter being connected directly to ground. The output circuit connected to plate 45 includes in series a trigger relay 48 and the secondary winding of transformer 49, which is connected to ground at its end opposite trigger relay 48; the primary of transformer 49 is connected to a commercially available alternating current power source. The input circuit of trigger tube 43 connected to control grid 46 comprises in series a delay network, which consists of the parallel circuit of resistor 50 and of capacitor 51, and grid leak resistor 52. Trigger control circuit T.C. is connected to the junction between the delay circuit and grid leak resistor 52 so that ground is applied to control grid through pens 3 and 3′ in case of pen interference or through contacts 32 and 32′ in case of overlap of arms 18 and 18′. In order to provide appropriate negative bias on grid 46 a source of direct current voltage B— is applied to the aforementioned junction through resistor 53, which together with grid leak resistor 52 constitutes a bleeder circuit for the negative supply B—. Trigger relay 48, which is of the slow-release type, comprises a normally open contact 54 which is connected to ground. The stationary contact 54′ thereof is connected to one side of the energizing coils of relays 55 and 56 through normally closed contacts 57 and 60′, relays 55 and 56 being arranged in a so-called "W–Z" circuit as will be more fully described hereinafter. The other side of the coils of relays 55 and 56 are connected to B— through current limiting resistors 58 and 59. Manual pen interchange switch $S_1$ is connected in parallel with contacts 54 and 54″.

Relay 55 operates two single-pole, single-throw contacts of which the two normally open, movable contacts 60 and 61 are both connected to ground. Stationary contact 60' is connected to one side of the coils of relays 55 and 56 while stationary contact 61' applies ground to certain parts of the pen interchange relay panel 40 upon operation of relay 55 as will be more fully described below. Relay 56 is of the single-pole, double-throw type with the movable arm 62 normally making contact with stationary contact 62' which is connected to the junction between the other side of the energizing coil of relay 56 and resistor 59. The other stationary contact 62" is connected to the junction between the other side of the coil of relay 55 and resistor 58.

The pen interchange relay panel 40 comprises four input terminals 63, 64, 65 and 66 four output terminals 67, 68, 69 and 70. The output signals $S_{X_1}$ and $S_{Y_1}$ from computer 34 are applied to input terminals 63 and 64, and the output signals $S_{X_2}$ and $S_{Y_2}$ from computer 34' to terminals 65 and 66 respectively. Signals $X_L$, $Y_L$, $X_R$ and $Y_R$ are fed from output terminals 67, 68, 69 and 70 after appropriate amplification in amplifiers 42 to motors 19, 5, 19' and 5' respectively. Relay panel 40 further comprises three relays 71, 72 and 73 of which relay 72 is of the slow release type. The energizing coil of relay 71 is connected at one end to the negative power supply B— through current limiting resistor 74 and at the other end to stationary contact 61' in the trigger circuit 41. Relay 71 operates three single-pole, double-throw contacts 75, 76 and 77 respectively and one single pole, single-throw contact 78. Movable contact 75 is connected to input terminal 63 and normally rests against stationary contact 75' which is connected to output terminal 67 thereby establishing a circuit between input terminal 63 and output terminal 67 with relay 71 deenergized. Movable contact 76 is connected to input terminal 65 and normally rests against stationary contact 76" which is connected to output terminal 69, thereby establishing a circuit between input terminal 65 and output terminal 69 with relay 71 deenergized. Stationary contact 76' is connected in parallel with stationary contact 75', and stationary contact 75" in parallel with stationary contact 76". Movable contact 77 which normally rests against stationary contact 77" and movable contact 78 which is normally open are both connected to ground. Relay 73 operates four single-pole, double-throw contacts 79, 80, 81 and 82 and one single-pole, single throw contact 83. Movable contact 79 is connected to the control grid 46 of trigger tube 43 through isolating resistor 89, stationary contacts 79' and 79" being connected to stationary contacts 77" and 77' respectively. Movable arm 80 is connected to input terminal 64 and normally rests against stationary contact 80' which is connected to output terminal 68 thereby establishing a circuit between input terminal 64 and output terminal 68 with relay 73 deenergized. Movable arm 81 is connected to input terminal 66 and normally rests against stationary contact 81" which is connected to output terminal 70 thereby establishing a circuit between input terminal 66 and output terminal 70 with relay 73 deenergized. Stationary contact 80" is connected in parallel with stationary contact 81", and stationary contact 81' in parallel with stationary contact 80'. Movable contact 82 is connected to one side of a six volt, alternating current power supply, the other side of which is connected directly to green lamp 84 and red lamp 85. Movable contact 82 normally rests against stationary contact 82" thereby establishing a circuit for lighting green lamp 84 with relay 73 deenergized thus indicating normal operation. Movable contact 83, which is normally open is connected to movable contact 78. The energizing coil of relay 73 is connected at one end thereof to the direct current power supply B— through current limiting resistor 86. The energizing coil of relay 72 is connected at one end to the direct current power supply through current limiting resistor 87, the other end being connected to resistor 89 in the grid circuit of trigger tube 43. Relay 72 operates one single-pole double-throw contact the movable contact 88 of which is connected in parallel with movable contact 78 and normally rests against stationary contact 88' which is connected to ground. Stationary contact 88" is connected to the other end of the energizing coil 73.

*Operation*

Signal voltages $S_1$ and $S_2$ from observing posts 33 and 33' are applied to computers 34 and 34' respectively during the tracking of the moving objects and are representative of the two-dimensional positions thereof. Computers 34 and 34' resolve signals $S_1$ and $S_2$ into their vertical and horizontal components $S_{X_1}$, $S_{Y_1}$, and $S_{X_2}$, and $S_{Y_2}$ respectively which may selectively represent present or predicted positions of the two moving objects as is well-known in the art of computers. Signal $S_{X_1}$ is applied to terminal 63, signal $S_{Y_1}$ to terminal 64, signal $S_{X_2}$ to terminal 65, and signal $S_{Y_2}$ to terminal 66 of pen interchange relay panel 40. The signals $X_L$, $Y_L$, $X_R$ and $Y_R$ from output terminals 67, 68, 69 and 70 energize motors 19, 5, 19' and 5' respectively after appropriate amplification in amplifiers 42. Motors 19 and 19' drive pen mechanisms 2 and 2' in the horizontal direction in accordance with signals $X_L$ and $X_R$ corresponding to signals $S_{X_1}$ and $S_{X_2}$ respectively during normal operation of pen interchange relay panel 40. Likewise motors 5 and 5' drive pens 3 and 3' in the vertical direction in accordance with signals $Y_L$ and $Y_R$ corresponding to signals $S_{Y_1}$ and $S_{Y_2}$ respectively during normal operation of pen interchange relay panel 40.

Control grid 46 of trigger tube 43 is normally biased to approximately —4 volts through bleeder circuit consisting of resistors 53 and 52, which prevents it from firing, so that relay 48 is normally unoperated. However when interference between pens 3 and 3' or interference between arms 18 and 18' as a result of lateral pen overlap in excess of 1.75 inches occurs, ground is applied to trigger control circuit T.C. through contact between pens 3 and 3' or through contact between knife-edge contacts 32 and 32'. Control grid 46 of trigger tube 43 to which trigger control circuit T.C. is connected, is thus grounded when pen or arm interference takes place, thereby firing tube 43 during the next succeeding cycle of positive voltage applied to plate 45 through transformer 49 and the coil of relay 48. The resulting plate current operates relay 48 which closes its contacts 54 and 54'. A ground is thus applied via contacts 54, 54' of relay 48 to contact 57 of relay 55 and to contact 62 of relay 56. This ground is then applied over contacts 57, 60' of relay 55 to the coil of normally deenergized relay 55, which consequently operates since one side of the direct current power source B— is also connected to ground. Although this ground is also applied to the energizing coil of relay 56, it does not operate since its coil is short-circuited by its contacts 62', 62 and contacts 54, 54' of relay 48. Operation of relay 55 results in closure of contacts 60 and 60' immediately followed by opening of contacts 60' and 57, contacts 60, 60' and 57 being of the make-before-break type. Closure of contacts 60 and 60' continues the ground on the coil of relay 55, and applies an independent ground to energizing coil of relay 56 so that the latter will be energized upon deenergization of relay 48. Operation of relay 55 also applies ground to relay 71 of the pen interchange relay panel 40 over contacts 61 and 61' thereby operating normally deenergized relay 71. Relay 72 which is normally energized by application of a ground to its energizing coil over contacts 77 and 77" of relay 71 and contacts 79' and 79 will be deenergized upon operation of relay 71 which breaks the circuit between contacts 77 and 77" and establishes a circuit between contacts 77 and 77'. Relay 72 is of the slow release type, however, and takes a period .4 second to release. Operation of relay 71 connects output terminal 67 to input terminal 65 over contacts 76' and 76, and outpute tcrimnal 69 to input terminal 63 over contacts 75" and 75, thereby interchanging the signals applied to motors 19 and 19' whereby pen mechanisms 2 and 2' are moved apart laterally. After expiration of the period of .4 second, relay 72 will become deenergized thereby establishing a ground for the coil of normally deenergized relay 73 over contacts 78 and 78' and contacts 83 and 88', which causes relay 73 to energize. Operation of relay 73 extinguishes the green lamp 84 indicative of normal operation and causes red lamp 85 to be lighted over contacts 82 and 82'.

Operation of relay 73 connects output terminal 68 to input terminal 66 over contacts 81' and 81, and output terminal 70 to input terminal 64 over contacts 80" and 80, thereby interchanging the signals applied to motors 5 and 5' whereby pens 3 and 3' are now also moved apart in the vertical direction. It is thus clear that the interchange of the input signals to the motors 19 and 5, and 19' and 5' of the left and right pen mechanisms 2 and 2' will relieve the pen or arm interference. Operation of relay 73 also reestablishes a ground connection to the energizing coil of relay 72 over contacts 79 and 79" of relay 73 and contacts 77' and 77 of relay 71 whereby relay 72 is again operated. However the ground on the coil of relay 73 is continued over its contacts 83' and 83 and contacts 78 and 78' of relay 71.

This sequence of operation interchanges the "X" data first and thus permits ploting arms 18 and 18' to move apart and separate before the "Y" data are interchanged. As soon as the interference is relieved whereby ground is removed from trigger control circuit T.C., the negative bias is restored to the grid 46 of the trigger tube 43, and as soon as its plate voltage reaches zero on the alternating current cycle, it will cease to pass the plate current thereby deenergizing relay 48 which opens the ground on contact 54'. As soon as the ground is removed from contact 54' the short-circuit via contacts 62 and 62' across the energizing coil of relay 56 is removed, whereupon relay 56 is energized over contacts 60 and 60' of relay 55 which continues to be energized over its self-locking circuit comprising contacts 60 and 60'. Operation of relay 56 establishes a circuit between contacts 54' and the side of resistor 58 connected to the coil of relay 55 over contacts 62 and 62" thereby preparing the so-called W–Z circuit for the next cycle of operation in case of another pen or arm interference. It is to be noted that both relays 55 and 56 remain energized under these conditions over contacts 60 and 60' whereby the ground circuit is continued for relay 71 over contacts 61 and 61' so that relays 71, 72 and 73 also remain energized after completion of the aforementioned sequence of operation of trigger circuit 41 and pen interchange relay panel 40. Furthermore in order to prevent an immediate reoperation of trigger tube 43 through accidental contact of the pens 3 and 3' or contacts 32 and 32' while the initial interference is relieved, the delay circuit consisting of the parallel arrangement of resistor 50 and capacitor 51 is connected in the grid circuit 46, the operation of which is obvious from a consideration of the typical values of the circuit parameters which may be as follows:

$R_{50}$=1 megohm.
$C_{51}$=1 microfarad.
$R_{52}$=11 kilohms.
$R_{53}$=.25 megohm.
$R_{84}$=1 megohm.

A subsequent interference will again operate relay 48 as explained above and apply ground to contact 54' from contact 54. Contact 54 however is now connected to resistor 58 at its connection with the coil of relay 55 over contacts 62 and 62" thereby short-circuiting the coil of relay 55 which will drop out. Deenergization of relay 55 will open the circuit between contacts 61' and 61 thereby removing the ground from relay 71 of the pen in interchange relay panel 40. The ground applied to contact 60' from contact 60 will also be removed upon operation of relay 55. However since contacts 60, 60' and 57 are of the make-before-break type, ground will be continued on coil of relay 56 over contacts 54 and 54' of relay 48 and contact 57 and 60 of relay 55 as long as the interference continues energization of relay 48. Since relay 56 remains energized, the energizing coil of relay 55 remains short circuited over contacts 62 and 62" thereby preventing operation of relay 55.

Deenergization of relay 71 as a result of deenergization of relay 55 again connects output terminal 67 to input terminal 63 over contacts 75' and 75, and output terminal 69 to input terminal 65 over contacts 76" and 76, thereby again interchanging at first the signal voltages applied to motors 19 and 19' whereby pen mechanisms 2 and 2' are moved apart laterally. Removal of the ground from contact 77" will deenergize relay 72, which will drop out after a period of .4 second, thereby removing the ground connection from the coil of relay 73 over the self-locking circuit comprising contacts 83 and 83'. Deenergization of relay 73 again connects output terminal 68 to input terminal 64 over contacts 80' and 80, thereby again interchanging the signal voltages applied to motors 5 and 5' whereby pens 3 and 3' are moved apart in the vertical direction. It is thus seen that the "X" data is again interchanged first thereby permitting the plotting arms 18 and 18' to move apart and separating the arms before the "Y" data are interchanged. Upon deenergization of relay 73, red lamp 85 is extinguished and green lamp 84 lighted over contacts 82 and 82" thereby indicating again normal operation. Deenergization of relay 73 will also establish an energizing circuit for relay 72 which may be traced from ground over contacts 77 and 77" of relay 71 and contacts 79' and 79 of relay 73 to the coil of relay 72. Relay 72 will thereafter assume its normally energized condition in preparation for the next cycle of operation.

Upon deenergization of relays 71 and 73, followed by an interchange of the signals representing the X and Y data of the two moving objects the interference will again be relieved, thereby removing ground from control grid 46 of trigger tube 43 and deenergizing relay 48 as explained above. Deenergization of relay 48 will open contacts 54 and 54' thereby removing ground from the coil of relay 56 which will consequently drop out. This trigger circuit 41 and pen interchange relay panel 40 are again readied for another cycle of operation with relays 48, 55 and 56 as well as relays 71 and 73 deenergized and with only relay 72 operated which are the normal operating conditions of these relays. Operation of manual pen interchange switch $S_1$ would have the same effect on the circuits as energization of relay 48 as a result of interference, and the sequence of operation is therefore not described herein.

As pointed out above, the pen interchange relay system in accordance with the present invention is not limited to the particular embodiment of plotting the observed positions of two objects in space as illustrated herein, but may be equally used to plot present, observed position and predicted, future position of one and the same object or target. Furthermore, the present pen interchange relay system is not limited in its application to a plotting board for plotting Cartesian coordinates but is equally applicable for use with other coordinate systems, such as, for example, polar coordinates and cylindrical coordinates.

While we have shown and described only one preferred embodiment of our invention it will be obvious to those skilled in the art that it is not so limited, but is susceptible of various other changes and modifications without departing from the spirit thereof, and we desire, therefore, that only such limitations shall be placed thereupon as are imposed by the prior art or as are specifically set forth in the appended claims.

We claim:

1. In combination with a plotting board capable of simultaneously plotting two-dimensional information of the positions of two points in space including two pen mechanisms, each operated independently in accordance with signals representative of said two-dimensional information of one of said two points, a pen interchange control circuit having two input and two output channels for interchanging the connections between respective input and output channels, each of said output channels being connected to one of said pen mechanisms respectively, a normally inoperative trigger circuit, means for operating said trigger circuit in response to interference between said pen mechanism, circuit means between said trigger circuit and said control circuit operative in response to operation of said trigger circuit for interchanging the connections between respective input and output channels, and means for applying a signal representative of the position of one of said points to each of said input channels, said circuit means including delay means for delaying the interchange of the signals in each channel representative of one dimension with respect to the signals representative of the other dimension.

2. A control circuit for interchanging the signals between the input circuits and corresponding output circuits thereof in response to the occurrence of a predetermined condition in said output circuits comprising normally inoperative first relay means, trigger means operative in response to the occurrence of said condition for energizing said first relay means, normally inoperative second relay means operative in response to energization of said first relay means, normally inoperative third relay means, normally inoperative fourth relay means, normally inoperative fourth relay means operated in response to energization of said second relay means, normally inoperative fifth relay means operated in response to energization of said fourth relay means, delay means interconnected between said fourth and fifth relay means to delay energization of said fifth relay means, means responsive to operation of said fourth and fifth relay means for deenergizing said first relay means and for energizing said third relay means.

3. A control circuit for interchanging the signals between the input circuits and corresponding output circuits thereof in response to the occurrence of a predetermined condition in said output circuits comprising first relay means, a trigger means operative in response to the occurrence of said condition for energizing said first relay means, normally inoperative second and third relay means, said second relay means being operated in response to energization of said first relay means, normally inoperative third relay means, fourth relay means operative in response to energization of said second relay means, fifth relay means operative in response to energization of said fourth relay means, delay means interconnected between said fourth and fifth relay means to delay energization of said fifth relay means by a predetermined time, and means to energize said third relay means in response to energization of said fifth relay means, said signals being interchanged by operation of said fourth and fifth relay means.

4. A control circuit for interchanging the signals between two input channels and two output channels in response to the occurrence of a predetermined condition in said output channels comprising a normally quiescent trigger tube, means responsive to occurrence of said condition for energizing said trigger tube, a normally deenergized first relay energized in response to energization of said trigger tube, a normally deenergized second relay energized in response to energization of said first relay, a normally deenergized third relay, a normally deenergized fourth relay energized in response to energization of said second relay, a normally energized delay relay deenergized a predetermined time after energization of said fourth relay, a normally deenergized fifth relay energized in response to deenergization of said normally energized delay relay, first circuit means responsive to energization of said fifth relay for consecutively reenergizing said delay relay and for consecutively deenergizing said trigger tube and said first relay, second circuit means for energizing said third relay in response to said last-mentioned deenergization, third circuit means responsive to reoccurrence of said condition for consecutively reenergizing said trigger tube and said first relay and for consecutively deenergizing said second relay and said fourth relay, and fourth circiut means responsive to deenergization of said fourth relay for deenergizing said delay relay and for consecutively deenergizing, after expiration of said predetermined time, said fifth relay, said trigger tube, said first relay and said third relay, said signals being interchanged upon operation of said fourth and fifth relays.

5. In combination with a plotting board capable of simultaneously plotting two-dimensional information of two movable points including two pen mechanisms, each operated independently in accordance with the information of a respective one of said points, a pen interchange circuit arrangement for interchanging the signals applied to said two pen mechanisms upon the occurrance of interference therebetween comprising two input channels and two output channels, a normally quiescent trigger tube, means responsive to occurrence of said interference for energizing said trigger tube, a normally deenergized first relay energized in response to energization of said trigger tube, a normally deenergized second relay energized in response to energization of said first relay, a normally deenergized third relay, a normally deenergized fourth relay energized in response to energization of said second relay, a normally energized delay relay deenergized a predetermined time after energization of said fourth relay, a normally deenergized fifth relay energized in response to deenergization of said normally energized delay relay, first circuit means responsive to energization of said fifth relay for consecutively reenergizing said delay relay and for consecutively deenergizing said trigger tube and said first relay, second circuit means for energizing said third relay in response to said last-mentioned deenergization, third circuit means responsive to reoccurrence of said interference for consecutively reenergizing said trigger tube and said first relay and for consecutively deenergizing said second relay and said fourth relay, and fourth circuit means responsive to deenergization of said fourth relay for deenergizing said delay relay and for consecutively deenergizing after expiration of said predetermined time said fifth relay, said trigger tube, said first relay and said third relay, said signals being interchanged upon operation of said fourth and fifth relays.

6. The combination comprising a plotting board, two pen mechanisms operable on said board to indicate the positions of two points in space, means for driving said pen mechanisms, a pen interchange control circuit comprising two input and two output circuits and means for interchanging the connections between respective input and output circuits, each of said output circuits connected to one of said pen mechanism driving means, means for applying signals representative of the positions of the said points in space to each of the said input circuits, a normally inoperative trigger circuit connected to said pen interchange control circuit, and means for operating said trigger circuit in response to contact between said pen mechanisms on said board whereby the said pen interchange control circuit changes the connections between the respective input and output circuits to thereby remove pen mechanism interference, said trigger circuit including a delay circuit comprising a parallel arrangement of a resistor and a capacitor to prevent reoperation thereof through accidental contact between the said pen mechanisms while said pen mechanism interference is removed.

7. The combination comprising a plotting board, two pen mechanisms operable on said board to indicate the positions of two points in space, electrical motors connected to drive the said respective pen mechanisms, a pen interchange control circuit comprising two input and two output circuits and a plurality of relays connected to interchange the connections between respective input and output circuits, each of said output circuits connected to respective ones of said electrical motors, computers connected to each of the said input circuits and adapted to apply thereto signals representative of the positions of the said two points, a normally inoperative trigger circuit including a vacuum tube connected to said pen interchange control circuit relays, a contact on each said pen mechanisms for operating said trigger circuit in response to engagement therebetween whereby the said pen interchange control circuit relays change the connections between the respective input and output circuits to thereby remove pen mechanism interference, and a delay circuit comprising a parallel arrangement of a resistor and a capacitor connected to the grid of said trigger circuit vaccum tube to prevent reoperation of said trigger circuit through accidental engagement between the said pen mechanism contacts while said pen mechanism interference is removed.

8. The invention made in accordance with claim 7 wherein the said vacuum tube is a thyratron.

References Cited by the Examiner
UNITED STATES PATENTS
2,714,047    7/55    Dehmel _____ 346—8

LEYLAND M. MARTIN, *Primary Examiner.*